Figures 1, 2:
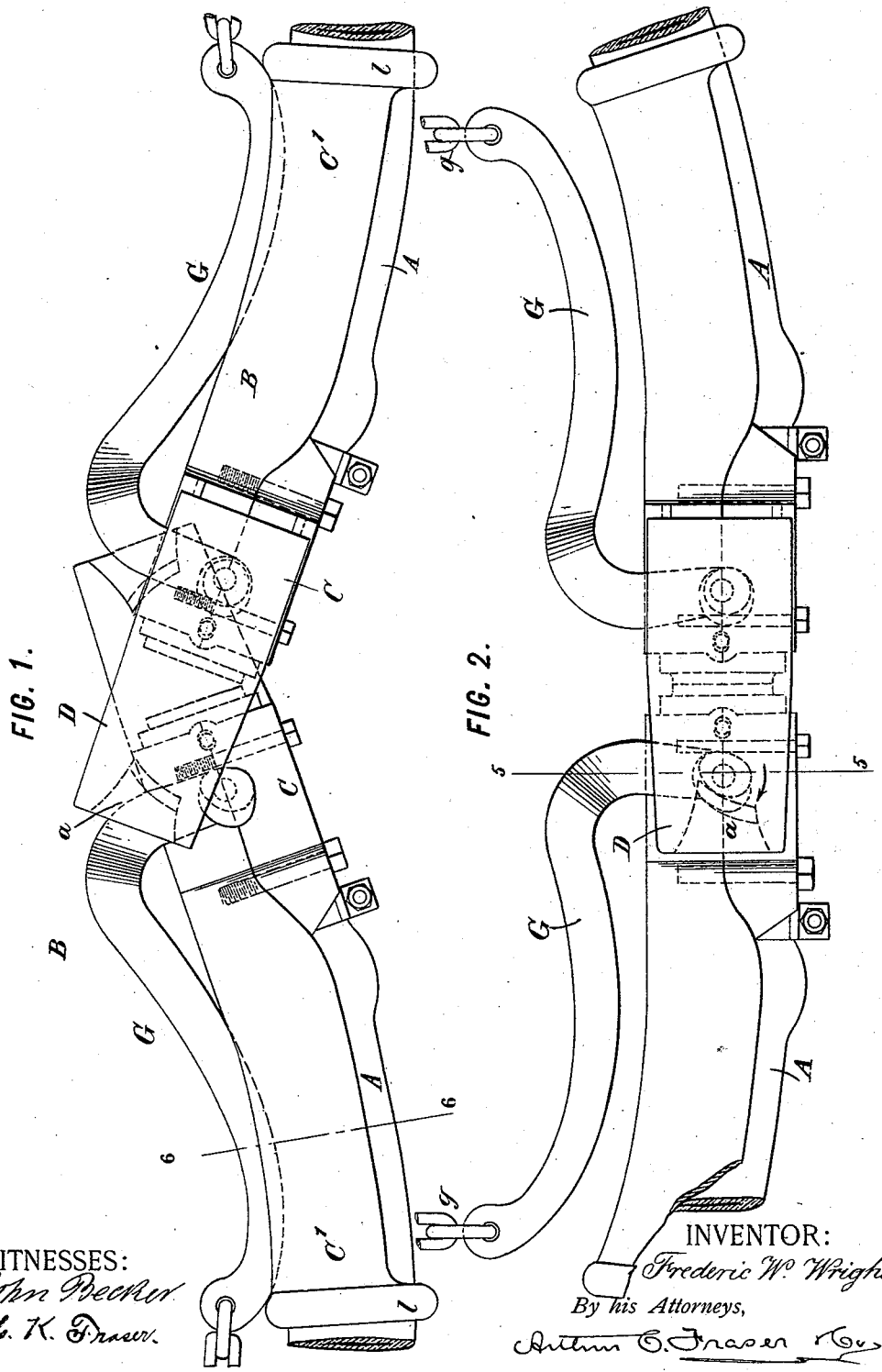

(No Model.) 3 Sheets—Sheet 1.

F. W. WRIGHT.
HOSE COUPLING.

No. 471,661. Patented Mar. 29, 1892.

WITNESSES:
John Becker
C. K. Fraser.

INVENTOR:
Frederic W. Wright
By his Attorneys,
Arthur E. Fraser (No Model.) 3 Sheets—Sheet 2.

F. W. WRIGHT.
HOSE COUPLING.

No. 471,661. Patented Mar. 29, 1892.

WITNESSES:
John Becker
C. K. Fraser

INVENTOR:
Frederic W. Wright
By his Attorneys,
Arthur C. Fraser & Co.

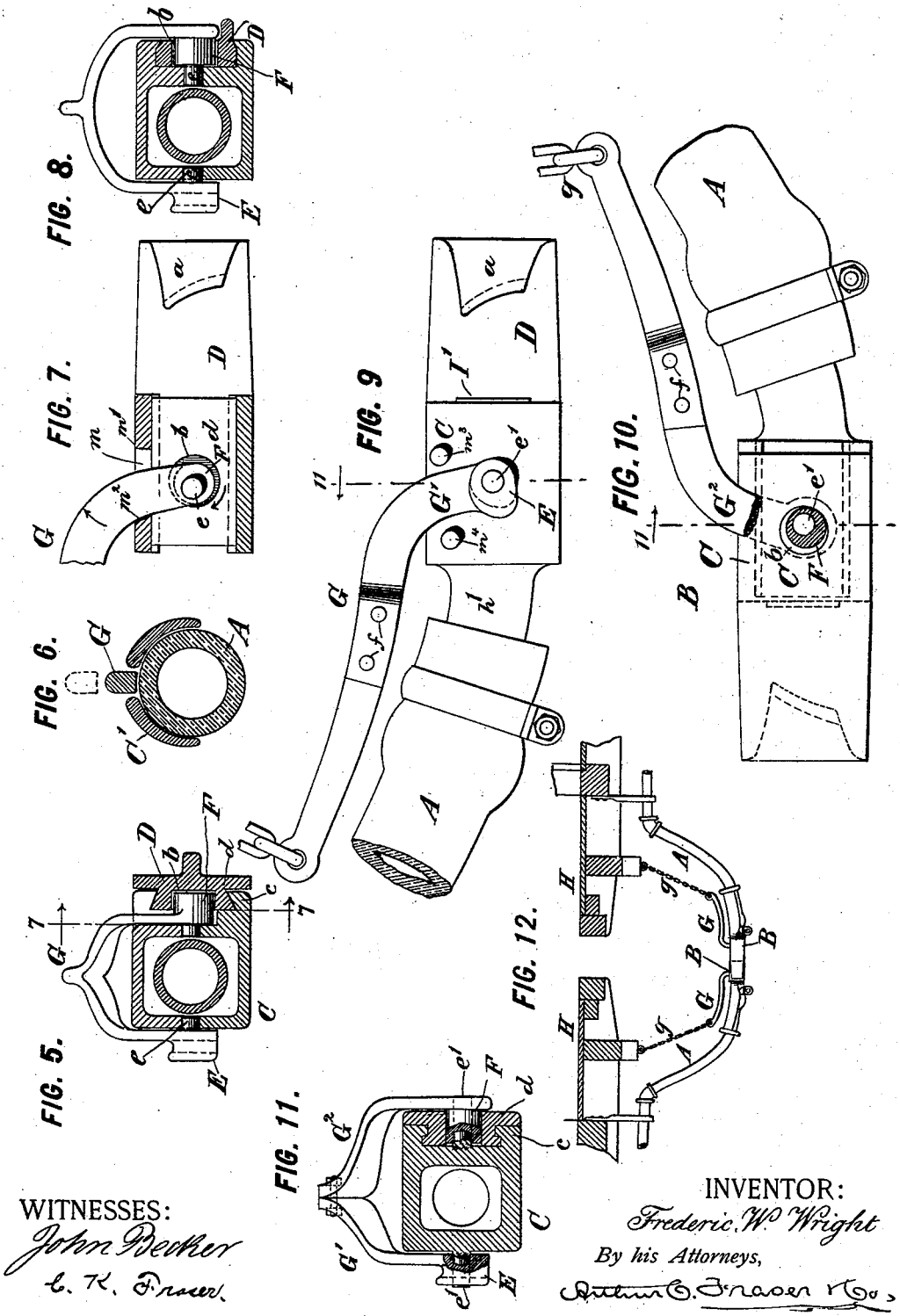

United States Patent Office.

FREDERIC W. WRIGHT, OF GREAT NECK, NEW YORK.

HOSE-COUPLING.

SPECIFICATION forming part of Letters Patent No. 471,661, dated March 29, 1892.

Application filed July 9, 1891. Serial No. 398,879. (No model.)

*To all whom it may concern:*

Be it known that I, FREDERIC W. WRIGHT, a citizen of the United States, residing at Great Neck, in the county of Queens and State of New York, have invented certain new and useful Improvements in Hose-Couplings, (Case E,) of which the following is a specification.

This invention relates to couplings for hose or flexible pipes, and is especially designed for coupling together the terminal hose-lengths applied to steam-heating pipes of railway-cars.

My improved coupling is of that class known as a "straight-port" or "direct-passage" coupling, the seating-faces meeting in a plane perpendicular to the general direction of the pipe. It also relates to those two-part couplings wherein each coupler consists of a head having a locking projection on one side and a locking-arm on the other side terminating in a locking projection, the respective locking projections being shaped to engage reciprocal projections on a like head, so that two heads may be locked together by a tilting movement in which the projections are caused to wedge eccentrically against one another, and thereby draw the two heads together and press their seats into contact.

The principal object of my invention is to provide a construction whereby in the act of coupling the seats shall be pressed more firmly together than heretofore.

My invention aims, also, to provide a coupler which may be so constructed and proportioned as to be capable of intercoupling with a so-called "Sewall" coupler, which is now so largely intoduced on railway-cars for coupling together the terminal lengths of hose connected with the steam-heating pipes.

To this end my invention provides the coupler with a lever pivotally connected to the coupling-head and having its long arm connected by a chain to some suitable support, so that when the head is coupled with another coupler and the coupling is dropped the consequent tilting of the lever shall act through a mechanical connection with the head to tighten the engagement of the locking or fastening devices. This mechanical connection is preferably made by means of one or more eccentrics interposed between the respective locking projections and the heads, so that as the levers are tilted the eccentrics exert a thrust in such direction as to force the heads toward each other. Preferably I attach the locking-arm movably to the head, as by a sliding connection, and provide the lever with an eccentric engaging the arm to draw the arm backward as the lever is rocked. On the opposite side of the head I also by preference pivot the locking projection to the head and connect it integrally to a lever, preferably the same lever, so that as the lever is displaced the projection is oscillated in such manner that its eccentric wedging-face acts against the locking-arm of the opposite head in such direction as to force the two heads together. I preferably form both the locking-arm and the opposite locking projection to be movable and connect them both with the one lever; but either of them may be made movable and connected with the lever, the other being fixed to the head.

Figure 3:
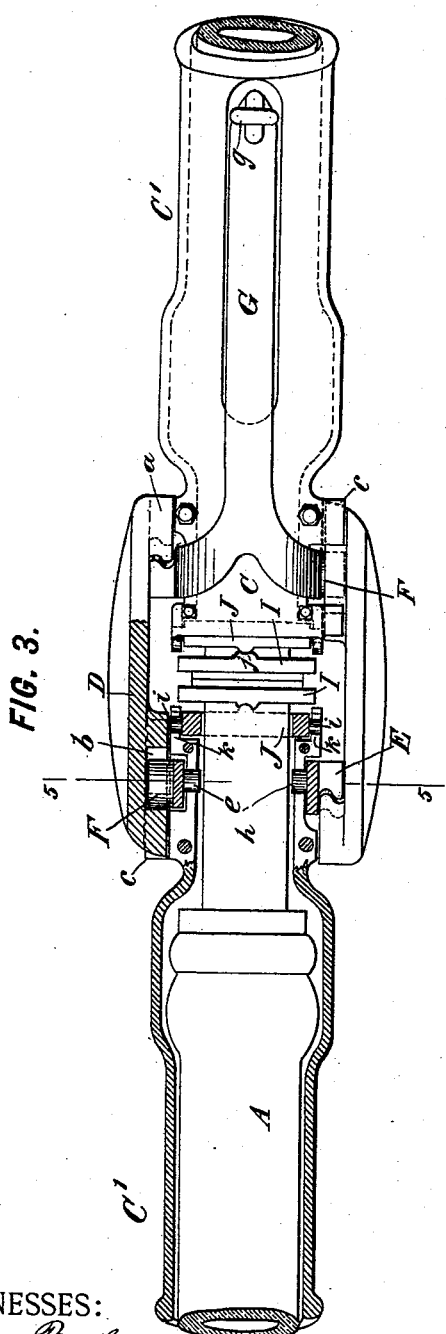
Figure 4:
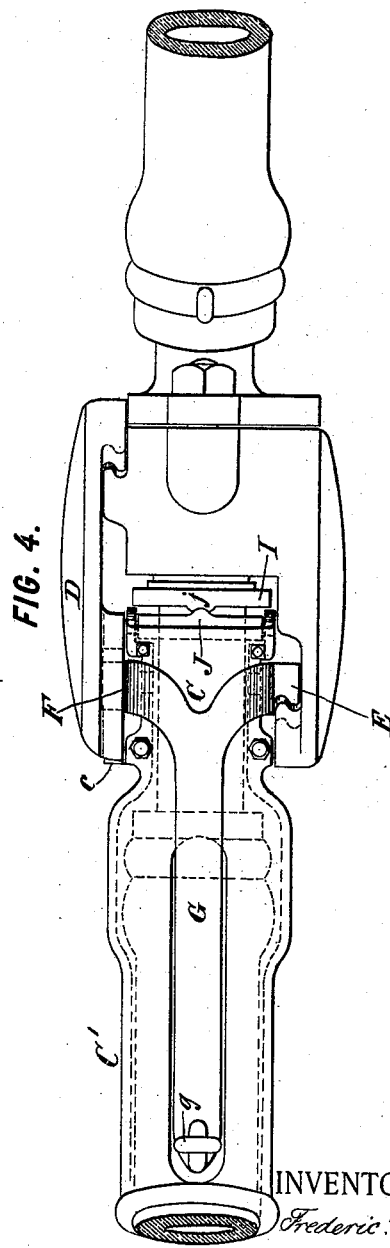

In the accompanying drawings, Figure 1 is a side elevation of the two parts of my improved coupling in its preferred form, showing them in the act of being coupled together. Fig. 2 is a side elevation thereof after being coupled. Fig. 3 is a plan thereof, one of the coupling-heads being partly in horizontal mid-section. Fig. 4 is a plan showing one of my improved couplers coupled with a Sewall coupler. Fig. 5 is a transverse section cut on the lines 5 5 in Figs. 2 and 3. Fig. 6 is a transverse section on the line 6 6 in Fig. 1. Fig. 7 is a vertical longitudinal section on the line 7 7 in Fig. 5. Fig. 8 is a transverse section answering to Fig. 5, but showing a modified construction. Figs. 9 and 10 are elevations from opposite sides, showing a modification of my invention. Fig. 11 is a transverse section on the lines 11 11 in Figs. 9 and 10. Fig. 12 is a view on a small scale, showing the platforms of two adjoining car-bodies, with the two sections of hose thereof coupled together by means of my improved coupler.

Let A A designate the respective lengths of hose, and B B the respective couplers. Each coupler consists of a head C, having on one side a locking-arm D, projecting beyond its seat and formed with a locking or wedging projection *a* and on the other side of the head a locking or wedging projection E.

I construct the locking-arm D to be movable relatively to the head C preferably by making it to slide longitudinally of the head. To this end it is formed with a dovetailed or undercut slideway $d$, engaging a similar slideway $c$, formed in one side of the head, as best shown in Fig. 5. The portion projecting beyond the end of the head is of ordinary construction, as also is the wedging or eccentric locking projection $a$. In the arm D is formed a recess $b$ of any suitable shape, into which projects an eccentric F, which is attached to a lever G, preferably by being made integral therewith. The lever G is forked, as shown in Figs. 4 and 5, the bifurcation on one side carrying the eccentric F and that on the other side being made integral with the locking projection E. This locking projection, instead of being fixed to the head C, as heretofore, is made movable relatively thereto by being pivoted to the head on an axis eccentric to its wedging or locking face. The pivotal axes of the eccentrics E and F should be in line with one another. By reason of these eccentrics being made integral with the lever their coinciding axes constitute the pivotal axis of the lever. The pivoting of the lever to the head may be done in various ways, that shown in Figs. 1 to 8 consisting in forming pivotal lugs $e\ e$ upon the inner sides of the eccentrics E F and confining these pivotal lugs in sockets or pivot-holes formed in opposite sides of the head C, which is divided into two halves, so that one half of each pivot-hole is formed in each half of the head. In the construction shown in Figs. 9, 10, and 11 similar pivotal lugs or studs $e'$ are formed integrally with and projecting from the opposite sides of the head, and the eccentrics E and F are formed with pivot-holes, which are slipped over these studs, the lever G being made in two parts $G'$ and $G^2$ to admit of thus connecting them, the two parts being subsequently united by screws or rivets $f$. The levers G G project backwardly over the top of the hose, and their free ends are connected by chains $g\ g$ to any suitable supporting-points—as, for example, to the car-platforms H H, as shown in Fig. 12. The chains $g\ g$ should be short enough so that when the couplers are coupled together and released their entire weight will hang from these chains, and will thereby tend to tilt or rock the levers G G from the position shown in Fig. 1, where each lever lies closely adjacent to the hose, to the position shown in Fig. 2, where the levers are tilted away from the hose. It is by this angular movement of the levers that the couplings are tightened after being coupled or preliminarily locked together.

In order to perform the coupling operation a train-man will grasp the respective couplers in his right and left hands, so that thereby he will hold the levers G G pressed downwardly close to the hose A A. He will then bring the couplers together in the manner shown in Fig. 1, and by a rocking movement he will interlock them, bringing them into line to the position shown in Fig. 2. He will then lower the coupling to the position shown in Fig. 12, where its entire weight hangs from the chains $g\ g$. By this act the levers G G will be tilted and will oscillate the eccentrics F E in such direction as to cause them to tighten the engagement of the coupling-heads. The eccentric F will turn in the direction of the arrow in Fig. 7, thereby bringing a portion of greater radius to bear against the rear side (in Fig. 7 the left-hand side) of the opening $b$ in the slide D, whereby the latter is drawn back to the extent of the thrusting movement imparted by this eccentric and its locking projection $a$ exerts an equal thrust or pull against the locking projection E of the opposite coupling-head, thereby drawing the latter toward the head carrying the sliding arm B. At the same time the eccentric E on the opposite side of the head is oscillated in the same direction as denoted by the arrow in Fig. 2, and thereby brings a portion of its wedging-face of greater radius to bear upon the wedging-face of the locking projection $a$ on the opposite coupling-head, so that it exerts a thrust against the latter, tending to draw both the heads closer together.

In coupling one of my improved couplers with a Sewall coupler, as shown in Fig. 4, the action is precisely that just described, while in coupling two of my improved couplers together the same action occurs on the part of each coupler, so that each draws the other toward it. It is to be noted that this drawing together or tightening action occurs after the couplers have been coupled together, whereas heretofore in all couplers, so far as I am aware, the locking action by which the seating-faces are pressed together is that which is due to the relative movements of the two coupling-heads, and consequently occurs during the act of coupling and not subsequent thereto.

I will proceed now to give a more complete description of the preferred construction illustrated in Figs. 1 to 7. In this construction the end of the hose A is fastened in any suitable manner to a tubular shank $h$, on the end of which is formed the seating-face or seat I. Around the shank $h$ and behind the projecting flange of this seat is arranged a distributing-ring J, having pivots $i\ i$ on opposite sides, which enter slots or pivotal holes in the head C to retain them in position. These rings have a rocking or pivotal connection with the seat I at top and bottom and diametrically opposite sides, which may be constructed as a lug on the one part entering a notch in the other, as shown at $j$ in Fig. 3. Adjacent to the pivots $i$ the coupling head or shell C is formed with rocking bearings, (indicated at $k\ k$ in Fig. 3,) which come against the ring, forming a pivotal connection on a horizontal axis. As the two coupling-heads are drawn together in the manner already described each head exerts a thrust against its ring at the points $k\ k$, and this thrust is transmitted through the ring at the pivots $j\ j$ to the seat I to force it against the opposite seat, and in case the two seats do not come together in the same plane sufficient freedom of motion is given to enable them by tilting to adapt themselves to one another. The seats thus tilt on the distributing-rings on vertical axes, and these rings tilt relatively to the heads on horizontal axes, so that a universal tilting motion is given, by means of which the pressure is equally distributed from the heads to all portions of the seats.

Each coupling-head C is constructed as a hollow shell sufficiently large to permit the seat I and the inclosed tubular shank $h$ the requisite freedom of movement within it. Each head is extended rearwardly to constitute a lever arm or tail C', the rear end of which is formed with a ring $l$, which embraces the hose A. The arm or tail C' is constructed, preferably, of approximately tubular form, partially inclosing the upper portion of the hose in the manner best shown by the cross-section, Fig. 6. It is preferably formed with a slot in its upper side, into which the lever G may enter, as shown in Figs. 1 and 6. The lever G thus enters sufficiently so that in the act of coupling, when the tail C' is being used as a handle, the lever will be pressed into it by the grasp of the operator, and consequently will be held in the position where the tightening-eccentrics are retracted. The advantage of the separate shell C, with its arm C', is that in the act of coupling by the adjacent coupler and the consequent flexure of the hose the lever-arms C' C' are tilted upwardly at their outer ends, so that at their inner ends they tend to hold the interlocking projections in engagement. This feature of construction forms no part of my present invention, being claimed in my patent, No. 449,789, dated April 7, 1891.

The angular movement of the lever G is limited by opposite stops applied to the head, which may be constructed in many different ways. One suitable way of constructing them is that shown in Fig. 7, where the head is formed with a slot $m$, in which the lever-arm works and against the opposite ends $m'$ $m^2$ of which the arm abuts at the opposite extremities of its movement. The same result is produced in the construction shown in Fig. 9 by the stop projections $m^3$ $m^4$ projecting from the side of the head and between which the lever-arm G' works.

The construction shown in Figs. 9, 10, and 11 does not differ, essentially, from that already described so far as my present invention is concerned, being a modification only in the sense that certain details of construction are omitted or modified. The hose A is attached to a shank $h'$, which is formed integrally with the head C. The seat I' is attached directly to the front end of the head in any suitable manner. The head C is hollow, as shown in Fig. 11, and forms itself the steam-passage.

My invention is susceptible of considerable modification without departing from its essential features. The use of eccentrics as the wedging or tightening devices in connection with the lever is not absolutely essential, as wedging or tightening devices of other shapes may be substituted. Any suitable relatively engaging, wedging, or cam surfaces that will exert a thrust by reason of the angular movement of the lever G may be used in applying my invention; nor is it essential that such wedging or tightening devices shall be applied at both sides of the coupling-head, as those on one side might be omitted.

The generically new feature of my invention I believe to be the provision of a coupling with means additional to the locking devices for drawing together or tightening the coupling-heads after the latter have been engaged and locked together in any manner heretofore known.

My invention in its generic features may be applicable to other types or constructions of coupling-heads than the particular type shown.

I claim as my invention the following-defined novel features or combinations, substantially as hereinbefore specified, namely:

1. A hose-coupling comprising two coupling-heads provided with interengaging locking projections for locking them together, combined with a supplemental tightening device consisting of a lever engaging said interlocking projections and a connection between said lever and a point of support, whereby the lever is adapted to be moved by the descent of the heads, and the lever constructed with a cam-surface, acting when thus moved to exert a thrust against said projections to draw the seating-faces more firmly together.

2. A hose-coupling comprising two coupling-heads having interengaging locking projections for locking them together, combined with a tightening device consisting of a lever pivotally engaging one of the heads, its projecting arm connected to a support, so as to be vibrated by the dropping of the heads after being coupled, and eccentric or wedging surfaces in connection with said lever, adapted by the movement thereof to exert a thrust against said locking projections in such direction as to force the seats more firmly together.

3. In a hose-coupling, a coupling-head having a locking projection on one side and a locking-arm on the other, the said arm constructed to be movable relatively to the head, a lever engaging said arm and head, and a connection between said lever and a point of support, whereby the lever is adapted to be moved by the descent of the heads after coupling and by its movement to retract the arm and thereby tighten the coupling connection.

4. In a hose-coupling, a coupling-head having a locking projection on one side and a locking-arm on the other, the said arm constructed to slide longitudinally relatively to the head, and a lever interposed between the head and arm and adapted by its displacement upon the dropping of the heads after coupling to retract the arm relatively to the head.

5. In a hose-coupling, a coupling-head having a locking projection on one side and a locking-arm on the other, the said arm constructed to slide longitudinally relatively to the head and formed with a recess, and a lever pivotally connected to the head and formed with an eccentric or wedging face engaging the arm within said recess and with a projecting arm connected to a support, whereby it is adapted to be moved by the descent of the heads after coupling, and thereby to cause said eccentric to exert a wedging thrust against the arm to retract it relatively to the head.

6. In a hose-coupling, a coupling-head having a locking-arm on one side and a locking projection on the other, said projection arranged to engage the locking-arm on a reciprocal head and constructed to be movable relatively to the head to tighten the coupling connection, a lever connected to said projection, so that by its angular movement it moves said projection, and a support from which the lever is hung, whereby it is so moved angularly by the descent of the heads after coupling.

7. In a hose-coupling, a coupling-head having a locking-arm on one side and a locking projection on the other, said projection pivotally connected to the head eccentrically to its locking-face, and a lever engaging said projection, adapted to be moved by the descent of the heads after coupling, and thereby to oscillate said projection in such direction as to increase the projection of its locking-face and exert a thrust against the engaging face of an opposite coupling-head to draw the seats of the respective heads more firmly together.

8. In a hose-coupling, a coupling-head having a locking-arm on one side, constructed to be movable longitudinally relatively to the head, and a movable locking projection on the other side, eccentrically pivoted to the head, and a lever movable by the descent of the heads after coupling engaging said projection and said arm to move them in such direction as to tighten the coupling connection.

9. In a hose-coupling, a coupling-head having a locking-arm on one side and a movable locking projection on the other, and a bifurcated lever, one fork of which connects with said locking projection and the other fork of which engages said locking-arm, the respective forks of said lever being pivotally engaged with said head.

10. In a hose-coupling, a coupling-head having a movable locking-arm on one side and a movable locking projection on the other, a lever pivotally engaging said head and connected to said projection and arm, respectively, and abutting stops on the head and lever, adapted to limit the angular movement of the lever.

11. In a hose-coupling, a coupling-head having a movable locking-arm on one side and a locking projection on the other and formed with a lever arm or tail extending backwardly and engaging the hose, a movable seat connected to the hose, and a tightening device consisting of a lever pivotally connected to the head, having an arm extending rearwardly and adapted to enter a recess in the lever-arm of said head and constructed to exert a wedging thrust against said locking-arm upon being vibrated out of engagement with said recess.

In witness whereof I have hereunto signed my name in the presence of two subscribing witnesses.

FREDERIC W. WRIGHT.

Witnesses:
GEORGE H. FRASER,
CHARLES K. FRASER.